United States Patent [19]

Kolbe et al.

[11] 4,059,497
[45] Nov. 22, 1977

[54] CORONA APPARATUS

[75] Inventors: Andreas Kolbe, Wiesbaden; Peter Dinter, Hallgarten, both of Germany

[73] Assignee: Hoechst Aktiengesellschaft, Frankfurt am Main, Germany

[21] Appl. No.: 749,442

[22] Filed: Dec. 10, 1976

[30] Foreign Application Priority Data

Dec. 13, 1975 Germany .............................. 2556228

[51] Int. Cl.² .............................. B01K 1/00; H01J 1/00
[52] U.S. Cl. .............................. 204/165; 204/168; 250/531; 250/534; 250/541
[58] Field of Search .................. 204/164, 165, 168; 250/531, 534, 541

[56] References Cited

U.S. PATENT DOCUMENTS

| 2,864,755 | 12/1958 | Rothacker | 204/165 |
| 3,081,214 | 3/1963 | Strome | 204/165 X |
| 3,257,303 | 6/1966 | Gould et al. | 204/168 |
| 3,308,045 | 3/1967 | Sullivan | 204/165 |
| 3,600,122 | 8/1971 | Coleman | 8/115.7 |

FOREIGN PATENT DOCUMENTS 1,182,704  3/1970  United Kingdom ................ 250/531

Primary Examiner—F.C. Edmundson
Attorney, Agent, or Firm—Richard L. Schwaab

[57] ABSTRACT

A corona apparatus comprising at least one roller electrode assembly, a supporting surface acting as a counter electrode, and a generator for generating an alternating current voltage for said electrode assembly characterized in that the roller electrode assembly comprises: a central shaft, an electrode, means for mounting said electrode to said shaft, a tube, means for mounting said tube for rotation about said shaft, said electrode contained within said tube, means for electrically connecting said electrode to said generator and means for supporting said shaft whereby said tube is positioned adjacent to said counter electrode.

19 Claims, 4 Drawing Figures

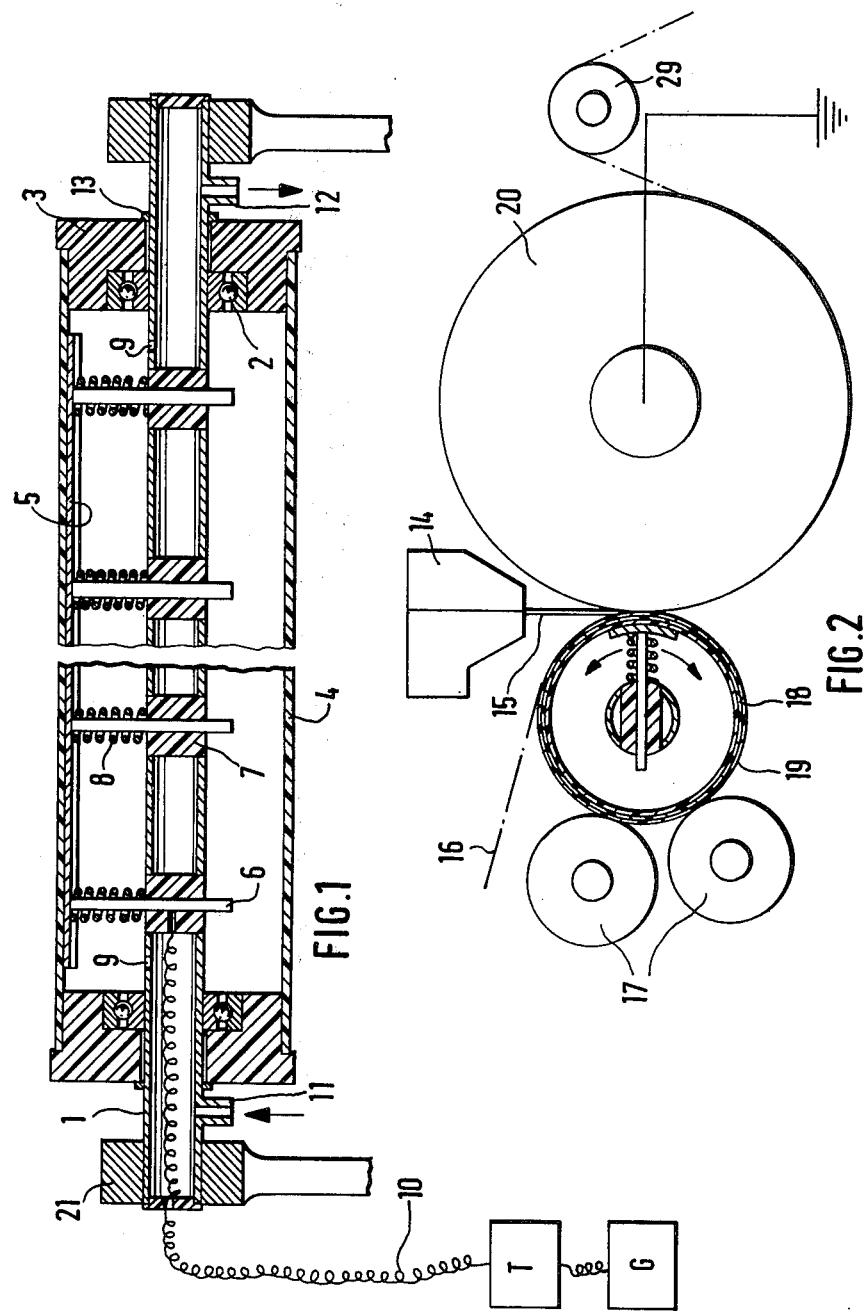

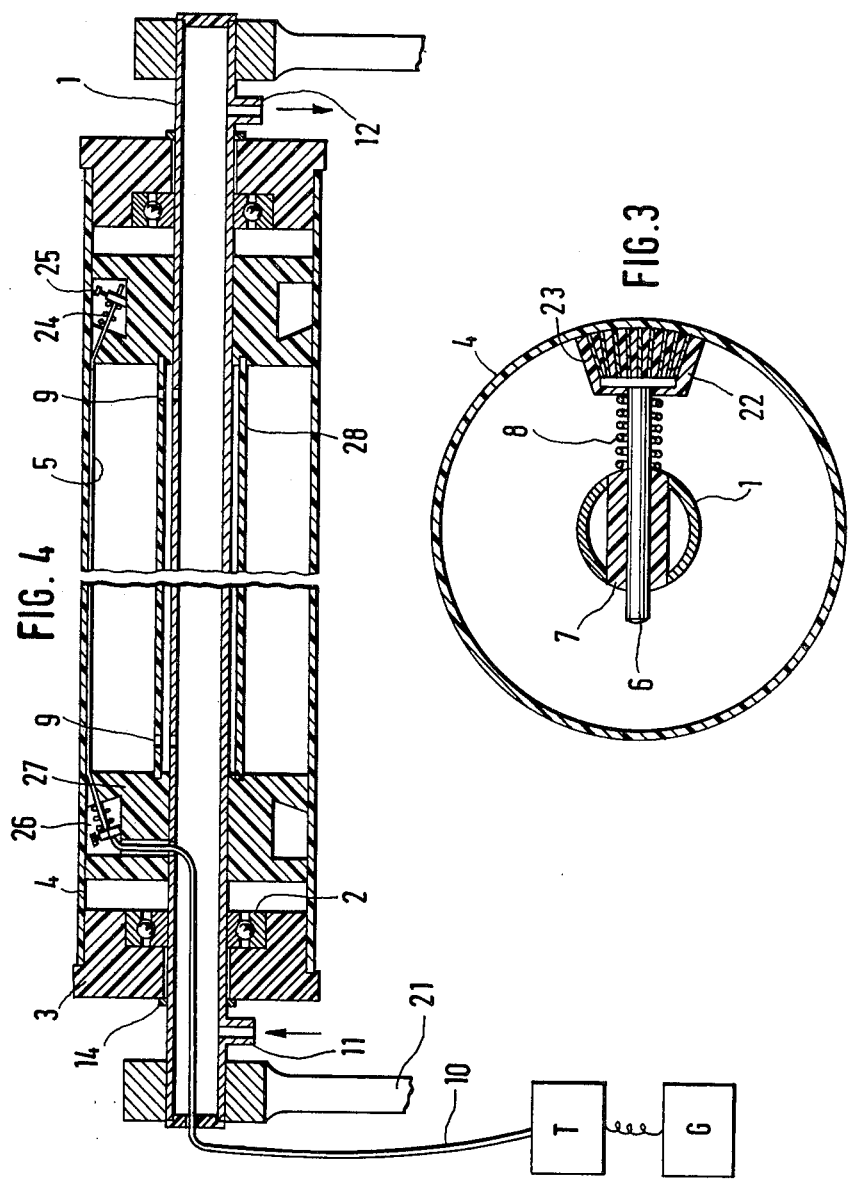

CORONA APPARATUS

BACKGROUND OF THE INVENTION

1. Field of the Invention

The present invention relates to a corona apparatus for the surface treatment of melts or films of thermoplastic materials or of metal foils.

2. Description of the Prior Art

The surface treatment of plastic materials or metals by means of corona devices is well known in the prior art.

Thus, films of thermoplastic materials or metal foils, e.g. aluminum foils, are subjected to electric corona discharges in order to render them more easily printable, or to improve their adhesion to layers applied by laminating or film coating processes, or to improve the cohesion of a composite material towards coatings applied from solutions or dispersions.

In most cases, the corona apparatus is so constructed that the materials to be treated are guided over a supporting surface, normally a roller, which acts as the counter electrode and is grounded, and that one or more electrodes are arranged above the supporting surface. By means of a generator, high-voltage alternating current is generated in the electrodes; more recently, processes have become known in which the electrode is supplied with high-frequency alternating current.

The corona apparatuses operating according to this basic principle more or less differ only in the design of the supporting surface used as the counter electrode. Thus, corona apparatuses are known which comprise a central roller and several electrodes, or several supporting rollers associated with a corresponding number of electrodes. Further, the supporting surfaces differ in the materials of their dielectric coverings. Thus, for example, coverings of glass, mica, ceramics, plastic materials, e.g. polyester, special types of rubber, e.g. silicone rubber, and the like are used. Further, the apparatuses are distinguished from each other by the design of their electrodes, which may be in the form of, for example, plate, wire, comb, knife, half-shell, spring, or spindle electrodes.

Finally, the known corona apparatuses differ in the generators used for producing the high-frequency alternating current, either low frequency, medium frequency, or high frequency generators being used.

Other known devices depart from this principle in that the electrode is coated and the supporting surface is uncoated. For this purpose, so called "roller electrodes" are used. Such electrodes are described, e.g., in U.S. Pat. No. 2,864,755 and in Canadian Pat. No. 553,045.

Corona apparatuses of this type have the essential advantage that in case of damage it is simpler and less expensive to replace the dielectric covering of the electrode than that of the supporting surface. The characteristic feature of the construction of such roller electrodes is that a metallic body is used which is in the form of a solid or hollow cylinder and that the shell of the cylinder is covered with a dielectric insulating layer. This layer may be applied to the cylinder by coating or by vulcanization and thus may be inseparably attached to the cylindrical body. More recently, replaceable roller coverings have been preferred, which advantageously use tubular materials which can be pulled over or shrunk on the cylinder.

Electrodes of this type have the drawback that the charged parts form a big mass and that, consequently, electrical losses occur by reflection. These losses result from the large reflecting surface of the electrode, since the entire roller body is energized even though only a fraction thereof is needed for use as the discharge area. These relations become even more unfavorable in the case of apparatuses of relatively large working widths, where the diameters of the roller electrodes must be increased for constructional reasons, e.g. to prevent the rollers from sagging. Since this results in an increased discharge area, the energy density and, consequently, the effectiveness of the pretreating process are reduced. Further, the electrode rollers become hot during the treatment, and cooling them is a problem which cannot be solved simply by rotating the rollers.

SUMMARY OF THE INVENTION

It is the object of the present invention to provide a corona apparatus comprising roller electrodes in which the disadvantages of the known roller electrodes are overcome in a manner constituting an advance in the art.

This object is achieved by a corona apparatus comprising at least one roller electrode assembly associated therewith a grounded supporting surface as the counter electrode, and, connected with the electrode, a generator for generating an alternating current voltage, preferably a high-frequency alternating current voltage, the corona apparatus being characterized in that the roller electrode assembly comprises a. a central axis or shaft to which supporting arms are attached for carrying the electrode, b. a tube of dielectric material supporting for rotation about the shaft and containing the electrode, c. means for electrically connecting the generator to the electrode, and d. means for supporting the shaft.

The corona apparatus according to the present invention has considerable advantages over the hitherto used roller electrodes. By reducing the number of live parts, electrical losses are substantially avoided, and by making the electrode adjustable by rotation, its effective area relative to the counter electrode and the melt or foil to be treated may be adjusted to optimum values.

In order to provide particularly favorable means for connecting the electrode and further reduce the mass of the apparatus, the axis is preferably designed in the form of a hollow axis.

The electrode may be a solid profile, preferably with a curvature corresponding to the radius of the tube, or it may consist of a bar which preferably carries several knife-shaped electrodes. Advantageously, the electrodes are made of metal wires, preferably several metal wires. Since heat is generated when the corona apparatus is in operation, the wires are advantageously connected to tensioning elements, for example springs, in order to prevent the wires from sagging, which might impair the optimum efficiency of the electrode.

In a particularly advantageous embodiment of the invention, undersirable heat is carried off. For this purpose, inlet and outlet branches are attached to the hollow axis and the hollow axis itself is provided with bores. By this construction, a cooling gas, for example air, may be passed through the apparatus to remove the heat generated.

In order to maintain the contact between the electrode and the tube, and thus favorably influence the efficiency of the apparatus, resilient elements, preferably tension springs, are fastened to the supporting arms, so that the electrode is maintained in constant contact with the tube.

The tube consists of dielectric material, and among the wide variety of plastic materials available, polycarbonate is preferred.

Alternatively, the tube may be covered by a dielectric material, and in practice it has proved to be particularly advantageous for the treatment of melts to apply a further, tubular covering of an anti-static and heat-resistant material.

The corona apparatus according to the invention was found to be very effective in practice, e.g. for treating melts of thermoplastic material and coated or uncoated films, for example polyolefin or polyester films.

BRIEF DESCRIPTION OF THE DRAWINGS

In the following, the corona apparatus according to the invention will be described by reference to FIGS. 1 to 4, but it is not intended to limit the invention to the embodiments shown in the drawings.

FIG. 1 is a sectional view, in the direction of the axis, of one embodiment of the inventive corona apparatus, in which the electrode is a profile electrode, FIG. 2 is a side elevation, in section, of a corona apparatus slightly different from that of FIG. 1 and its arrangement relative to the counter electrode, FIG. 3 is a side elevation, in section, of a corona apparatus comprising knife electrodes, and FIG. 4 is a sectional view, seen in the direction of the axis, of a corona apparatus comprising a wire electrode.

DETAIL DESCRIPTION OF THE PREFERRED EMBODIMENTS

FIG. 1 shows a roller electrode assembly comprising a central hollow axis or shaft 1 mounted in brackets 21. Supporting arms 6 held in insulations 7 are attached to the shaft 1. The supporting arms 6 carry an electrode 5, which in this case is designed as a profile or contour electrode and is connected, by lead wire 10, with a transformer T and a generator G. The shaft is provided with inlet and outlet branches or ports 11 and 12 for introducing and removing the cooling gas, which may pass through bores 9 into the electrode space. The shaft 1 is mounted for rotation in insulating connecting pieces 3 by means of the bearings 2. Clamping rings 13 prevent an axial displacement of the tube 4 on the shaft 1. Springs 8 ensure that the profile electrode constantly rests against the tube 4.

FIG. 2 shows an electrode which essentially resembles that of FIG. 1, except that the tube 4 is covered with a further dielectric covering of elastic rubber 18 and that the latter, in turn, is covered by a tubular covering 19 of heat-resistant material.

The melt 15 issuing from the extruder 14 enters the gap between the corona apparatus according to the invention and the roller-shaped grounded counter electrode 20 and is subjected to a corona treatment. The melt 15 and the substrate 16 converge between the roller electrode assembly and the counter electrode 20.

By rotating the shaft 1 with the supporting arms 6 carrying the electrode 5, the position of the electrode may be optimally adjusted to the conditions prevailing in each particular case. Rollers 17 are provided to cool and/or support the corona apparatus. The solidified film is drawn off from the roller 20 over the roller 29.

FIG. 3 shows a modification of the roller electrode assembly according to FIG. 1. Attached to the supporting arms there are profile bars 22 in which the knife electrodes 23 are embedded.

FIG. 4 shows another embodiment of the corona apparatus according to the invention. Metal wires serve as electrodes and are held in clips 25 and tensioned by springs 24. Component parts 24 and 25 are arranged in grooves 26 of the spacers 27 which consist of insulating material. Electrical spark-overs between parts 1 and 5 are prevented by an insulating tube 28. Otherwise, identical parts are marked by the same reference numerals.

What is claimed is:

1. A method for the surface treatment of melts, films, foils and the like using a corona apparatus having a roller electrode assembly and a supporting surface acting as a counter electrode comprising the steps of:
   a. positioning an electrode on a central shaft of said roller electrode assembly;
   b. rotatably mounting a tube about said electrode and said shaft;
   c. applying an alternating current voltage to said electrode; and
   d. positioning said tube adjacent said counter electrode thereby forming a nib for said melts, films, foils and the like;
   whereby said electrode produces an electric field in the region of said nib.

2. A method as recited in claim 1 further comprising the step of adjusting said roller electrode assembly by rotating said electrode relative to said tube.

3. Corona apparatus comprising at least one roller electrode assembly, a supporting surface acting as a counter electrode, and a generator for generating an alternating current voltage for said electrode assembly, characterized in that the roller electrode assembly comprises:
   a. a central shaft,
   b. an electrode,
   c. means for mounting said electrode on said shaft,
   d. a hollow of dielectric material tube
   e. means for mounting said tube for rotation about said shaft, said electrode contained within said tube,
   f. means for electrically connecting said electrode to said generator, and
   g. means for supporting said shaft whereby said tube is positioned adjacent said counter electrode.

4. Apparatus as recited in claim 3, wherein said means for mounting said electrode comprises insulation means for electrically insulating said electrode from said shaft and a conductive support arm connected to said electrode and insulation means.

5. Apparatus as recited in claim 4, wherein said means for electrically connecting said electrode to said generator comprises a transformer connected to said generator and a conductive lead connected between said transformer and said support arm.

6. Apparatus as recited in claim 5, wherein said shaft is hollow and a portion of said conductive lead is contained within said hollow shaft.

7. Apparatus as recited in claim 6, wherein said electrode is curved having a contour corresponding to the inner radius of said tube.

8. Apparatus as recited in claim 7, further comprising means for biasing said electrode toward the inner surface of said tube.

9. Apparatus as recited in claim 8, wherein said biasing means comprises a pressure spring.

10. Apparatus as recited in claim 3, further comprising means for biasing said electrode toward the inner surface of said tube.

11. Corona apparatus as recited in claim 3, characterized in that the electrode comprises a profile bar which carries a knife electrode.

12. Apparatus as recited in claim 11, wherein said profile bar carries a plurality of knife electrodes.

13. Apparatus as recited in claim 3, characterized in that the electrode consists of metal wire.

14. Apparatus as recited in claim 13, wherein said electrode consists of a plurality of metal wires.

15. Apparatus as recited in claim 14, further comprising tension springs connected to said wires.

16. Apparatus as recited in claim 3, characterized in that said shaft is hollow and provided with bores, and an inlet and outlet port for supplying a gaseous cooling medium to the interior of said tube.

17. Apparatus as recited in claim 3, further comprising means for adjusting said electrode by rotating said electrode relative to said tube.

18. Apparatus as recited in claim 3 wherein said dielectric material of said tube is a polycarbonate material.

19. Apparatus as recited in claim 3, characterized in that the tube is provided with a thin-walled, elastic, tubular covering of dielectric material and a further tubular covering of an anti-static and heat-resistant material.

* * * * *

UNITED STATES PATENT OFFICE
CERTIFICATE OF CORRECTION

Patent No. 4,059,497                    Dated Nov. 22, 1977

Inventor(s) Andreas KOLBE and Peter DINTER

It is certified that error appears in the above-identified patent and that said Letters Patent are hereby corrected as shown below:

Column 2, line 34, kindly delete "supporting" and insert
-- supported --;

Column 3, paragraph d., please correct to read as follows:
-- a hollow tube of dielectric material --.

Signed and Sealed this

Fourth Day of April 1978

[SEAL]

Attest:

RUTH C. MASON
Attesting Officer

LUTRELLE F. PARKER
Acting Commissioner of Patents and Trademarks